United States Patent [19]

Demke et al.

[11] 4,418,345

[45] Nov. 29, 1983

[54] DISPLAYING A FULL PAGE REPRESENTATION

[75] Inventors: Kent R. Demke; Joanne L. Mumola, both of Austin, Tex.

[73] Assignee: International Business Machines Corporation, Armonk, N.Y.

[21] Appl. No.: 219,666

[22] Filed: Dec. 24, 1980

[51] Int. Cl.³ .............................................. G09G 1/00
[52] U.S. Cl. ................................... 340/731; 340/721; 340/745; 340/750
[58] Field of Search ............... 340/723, 731, 748, 750, 340/728, 721, 745; 178/15, 30

[56] References Cited

U.S. PATENT DOCUMENTS

| | | | |
|---|---|---|---|
| 3,526,887 | 9/1970 | Erni | 340/753 |
| 3,553,676 | 1/1971 | Raciti | 340/750 |
| 3,654,609 | 4/1972 | Bluethman | |
| 3,903,517 | 9/1975 | Hafner | 340/731 |
| 3,921,164 | 11/1975 | Anderson | 340/728 |
| 4,107,664 | 8/1978 | Marino | |
| 4,168,489 | 9/1979 | Ervin | 340/731 |

OTHER PUBLICATIONS

*Abbreviated Character Font Display,* Bringol, IBM Tech. Discl. Bull., vol. 19, #9, 2/77, pp. 3248–3249.
*Combination of Alphanumeric & Formatting Data on CRT Display,* Webb, IBM Tech. Discl. Bull., vol. 15, #7, 12/72, p. 2146.

*Primary Examiner*—Marshall M. Curtis
*Attorney, Agent, or Firm*—Andrea P. Bryant

[57] ABSTRACT

A technique is disclosed which allows the display of a representation of a full page of text on the comparatively small CRT screen of a word processing system. For each character comprising a page of text a single bit is stored in the display buffer. On output each bit is displayed in one of two configurations of a 2×4 character box. In this way format and spatial relationship of text to page size can be displayed while a particular line is entered or edited to enable an operator to have a better perspective on the developing result.

8 Claims, 7 Drawing Figures

DISPLAYING A FULL PAGE REPRESENTATION

DESCRIPTION

CROSS-REFERENCES TO RELATED APPLICATIONS

U.S. patent application Ser. No. 219,668, filed Dec. 24, 1980, entitled "Interactive Combination Display," and having K. R. Demke and J. L. Mumola as inventors.

U.S. patent application Ser. No. 221,160, filed Dec. 30, 1980, entitled "Multiple Half-Line Spacing On A Miniature Page," and having K. R. Demke and J. D. Dwire as inventors.

U.S. patent application Ser. No. 227,109, filed Dec. 30, 1980, entitled "Proportionality In Miniature Displays," and having K. R. Demke as inventor.

U.S. patent application Ser. No. 221,671, filed Dec. 30, 1980, entitled "A Full Page Representation Through Dynamic Mode Switching," and having K. R. Demke and J. D. Dwire as inventors.

U.S. patent application Ser. No. 219,683, filed Dec. 24, 1980, entitled "Displaying A Proportionally Outlined Miniature Page," and having K. R. Demke and J. L. Mumola as inventors.

BACKGROUND OF THE INVENTION

1. Field of the Invention

This invention relates to text editing with the aid of a CRT. More particularly it relates to a technique for reducing and displaying a representation of a full page of text on less than the entire screen.

2. Description of the Prior Art

In word processing systems with a display for displaying text as it is entered and edited, an operator is usually unable to display an entire page because of the size of the screen. Oftentimes, however, seeing the entire page is desirable at it enables the operator to appreciate the proper spatial relationship of the text to the page boundaries.

One prior art technique for solving this problem is described in U.S. Pat. No. 4,168,489 wherein the actual text characters are compressed for the miniature format display. The height of each character is reduced by utilizing only certain of the rows of vertical dots. Horizontal reduction is accomplished by means of a circuit which decreases the current flowing through the horizontal winding of the cathode ray tube deflection yoke. The lessened current compresses the image width on the visual display screen. That patent also discusses other prior art techniques for reducing a page of text to fit within the confines of a partial page word processing system and points out why they are inappropriate. This reference teaches reduction of a page to about one-third its size so as to effectively fill the viewing area of the display. That is, a full page of text is displayed using characters reduced in both the horizontal and vertical dimensions by two-thirds. Not all of the compressed characters are legible. Normal word processing functions can be performed, however.

Another approach can be found in *IBM Technical Disclosure Bulletin* "Abbreviated Character Font Display," Volume 19, No. 9, February 1977, page 3248. That author discloses a technique for displaying significant shapes of characters, words and phrases to allow an operator the ability to quickly access a particular portion of the page without actually reading displayed text.

A different approach is illustrated in *IBM Technical Disclosure Bulletin* article "Combination of Alphanumeric and Formatting Data on the CRT Display," Volume 15, No. 7, December 1972, page 2136. A single dot is used to represent each normally 5×7 dot character. In this technique, the operator can see several lines of text in normal size as well as the total unit of text as represented by dots only. The active window area of the dot only portion of the display is intensified so that the operator can perceive the format relationship of the active text to the entire text.

U.S. Pat. No. 4,107,664 relates to raster scanned display systems in which character size is enlarged in the horizontal dimension by increasing the number of times each dot is sequentially displayed.

OBJECTS OF THE INVENTION

An object of the present invention is to provide a means for displaying a representation of a full page of text on less than an entire CRT screen.

It is a further object to display a miniature full page representation with a minimum of hardware circuitry.

It is yet another object of the invention to provide a technique for reducing the matrix size required for representing text on a display.

SUMMARY

The present invention overcomes the shortcomings of small display screen word processing systems by displaying a miniature representation of a full page of text. Reduction in the area required to display a full page is accomplished by first storing in the display buffer a one bit indication of the presence or absence of a character. Normally, the display buffer stores the addresses for a character generator, whereas in the miniature display mode a number of characters, in this case 16, are stored where the address of a single character code would ordinarily be stored. When it is time to display, a "1" causes a display of four dots in a 2×4 box and a "0" causes no dots to be displayed. The result is that each normally 8×16 character box character is represented in a 2×4 character box.

BRIEF DESCRIPTION OF THE DRAWINGS

Other features and advantages of the present invention will become apparent from the following description taken in connection with the accompanying drawing wherein:

FIG. 3 is a schematic illustration of a full size character box.

FIG. 4 shows the relationship between character boxes as used in the miniature display and regular size character.

DESCRIPTION OF THE PREFERRED EMBODIMENT

Figure 1:
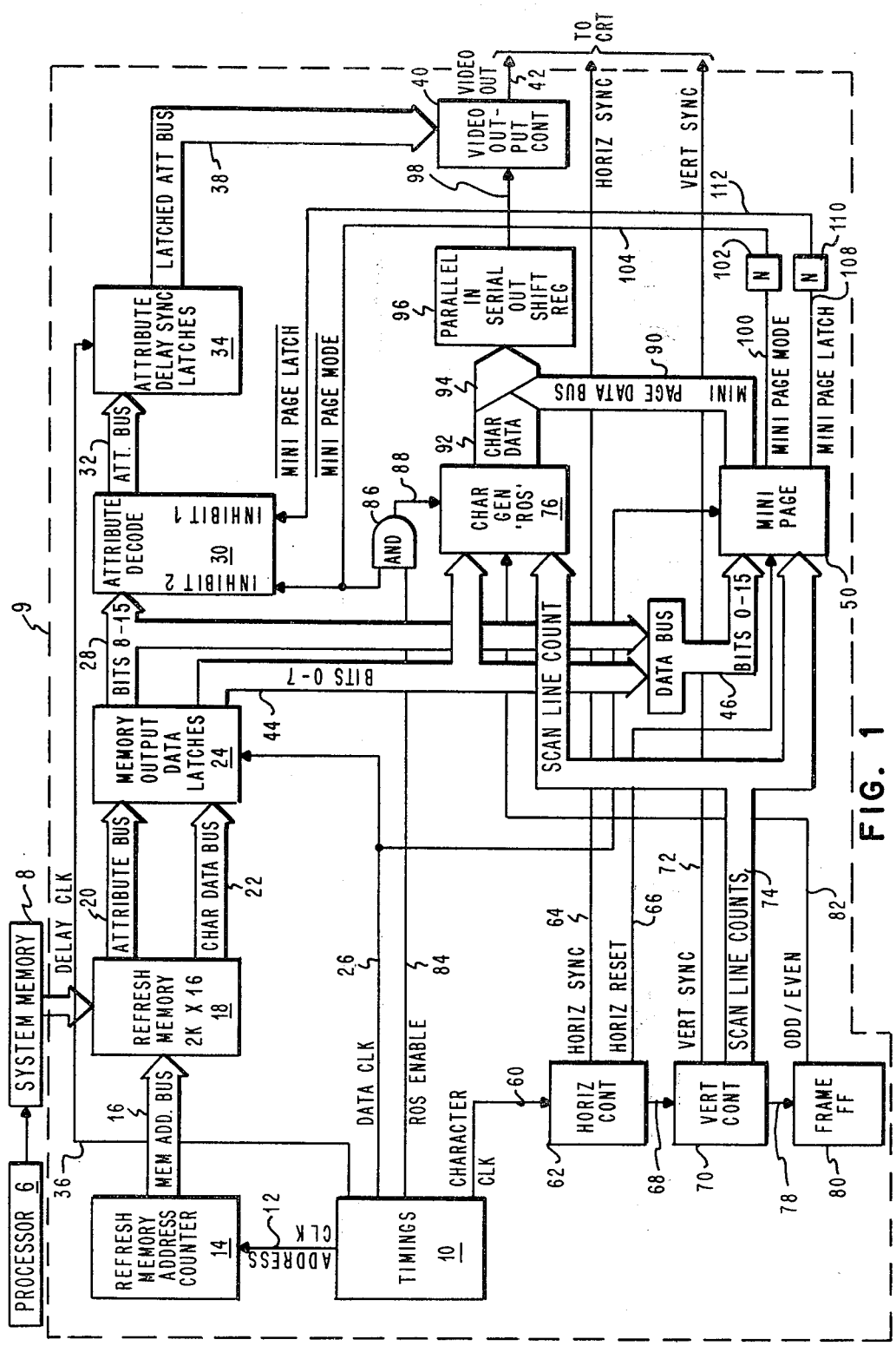
FIG. 1 is a block diagram of the system in which the present invention is implemented.

FIG. 1 is a block diagram of a typical implementation of a word processing system in which out invention is embodied. The illustrated system includes processor 6, main memory 8, a display, and display interface logic 9. Only those connections between processor 6, main memory 8 and display inteface logic 9 are shown as needed for purposes of explanation of our invention. Other interconnections therebetween are conventional and well understood by those skilled in the art.

Figure 7:
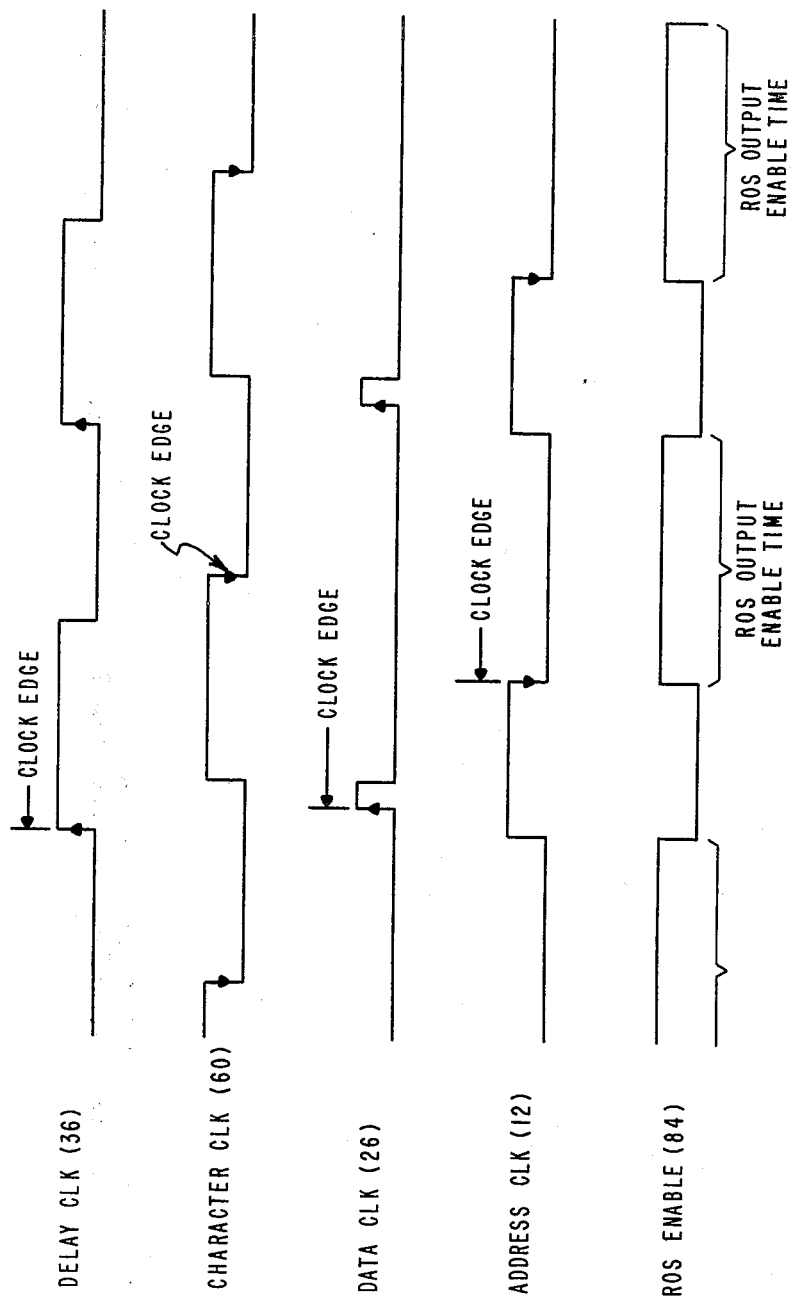
FIG. 7 is a timing chart for the signals output from the timing generator 10 in FIG. 1.

Timing generator block 10 provides various clocking signals for the word processing system illustrated. The relative timing of these signals is shown in FIG. 7. The address clock signal on line 12 is input to refresh memory address counter 14 whose output appears on memory address bus 16. The address on bus 16 is input to the refresh memory 18. Attribute bus 20, as well as character data bus 22, provide two outputs from refresh memory 18. The data on both busses 20 and 22 are latched into memory output data latches 24. Another clock signal from timing generator block 10 is the data clock on line 26 which is input to data latches 24 for controlling input thereto. The eight bits on bus 28 are output from latches 24 to attribute decoder 30. Once decoded, attribute data is output on bus 32 and is input to attribute delay synchronization latches 34 under control of delay clock signals on line 36. The latched attribute data is output on bus 38 to video output control 40. The output of video output control 40 is on line 42 and is the video input to the CRT monitor (not shown).

The other eight bits latched in memory data latches 24 are output along bus 44. The total 16 bits of character information from latches 24 on the two buses 28 and 44 are applied to data bus 46 and are input to miniature page generator 50. Miniature page generator 50 also receives signals from timing generator 10 data clocking signals along line 26.

The character clock signal on line 60 is also output from timing generator 10. Character clock signals on line 60 are input to horizontal control 62 which generates horizontal synchronization signals on line 64 which is one input to the CRT monitor (not shown). Also generated in horizontal control 62 are horizontal reset signals on line 66. Horizontal reset signals on line 66 are input to miniature page generator 50 for reasons which will become clear as this description progresses. Vertical clock signals are generated in horizontal control 62 and are passed along line 68 to vertical control 70. Vertical control 70, in a conventional manner, generates vertical synchronization signals along line 72 for input to the CRT monitor. Vertical control 70 also generates scan line counts on bus 74. Scan line count bus 74 is input to both miniature page generator 50, for purposes which will subsequently become clear, and to character generator storage 76. Vertical control 70 generates frame clock signals on line 78 which are input to frame flip-flop 80. Frame flip-flop 80 generates odd/even signals indicative of frame status in interlaced scanning terms and passes them along line 82 to character generator storage 76.

Character generator storage 76 also has an input from bus 44. Timing generator 10 generates the character generator storage enable signal (ROS ENABLE) along line 84 which is gated through AND gate 86. The signal arising in AND gate 86 passes along line 88 to enable character generator storage 76.

Miniature page generator 50 has three outputs. The first is along the miniature page data bus 90 which is DOT-OR'D with the character data bus 92 from character generator 76. Either bus 90 or bus 92 data, as will become clear, is on bus 94 which is input to parallel to serial shift register 96. Serial data is output on line 98 to video output control 40. Another output from miniature page generator 50 is the miniature page mode signal on line 100 which is inverted by inverter 102. The inverted value on line 104 is applied to both the Inhibit 2 input of attribute decode logic 30 as well as to AND gate 86. The final output of miniature page generator 50 is the miniature page latch signal on line 108 which is inverted by inverter 110. The inverted value of the miniature page latch signal on line 112 is the other input to the attribute decode 30.

Miniature page generator 50 is a key element of the system in which the present invention is implemented. Miniature page data to be displayed on the screen is written into refresh memory 18 using conventional write operations which form no part of the present invention. Once an operator has indicated to a system employing our invention a desire to display a miniature representation of a page, conventional techniques are used to read characters from the main or system memory 8 (FIG. 1) and to store "1"s for characters and "0"s for spaces in groups of 16 bits in display refresh memory 18.

Figure 2:
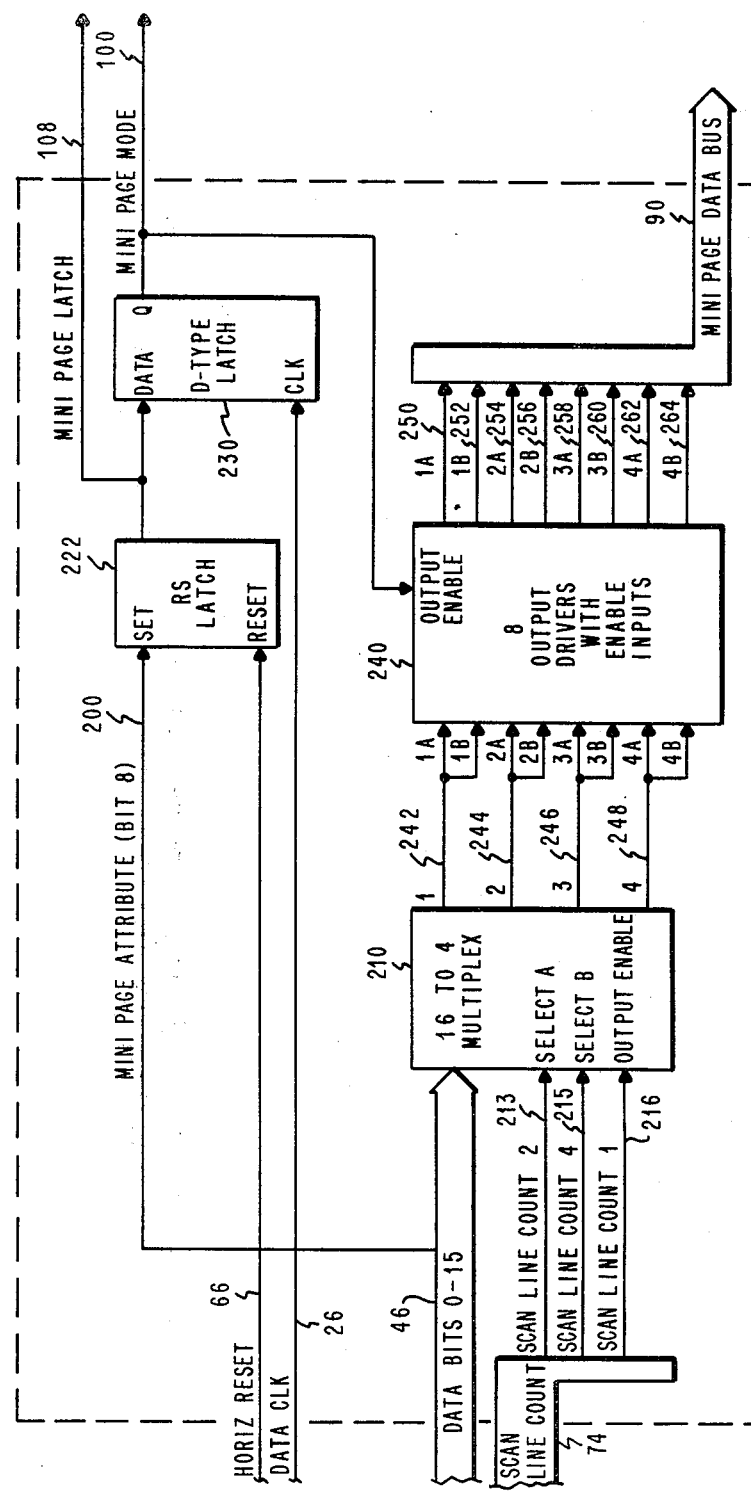
FIG. 2 is a more detailed block diagram of a miniature page generator 50 of FIG. 1.

Referring now to FIG. 2, the internal logic of miniature page generator 50 is shown in a greater level of detail. One of 16 data bits on bus 46, bit 8, is the miniature page attribute bit and is placed on line 200 to set RS latch 222. The reset input for RS latch 222 is provided by the horizontal reset signal on line 66. The output of RS latch 222 is the miniature page latch signal on line 108 which, as will be recalled, is inverted and then used as an inhibit input to attribute decode logic 30 of FIG. 1. Line 108 is also the data input to D Type latch 230. The clock input to latch 230 is the data clock signal on line 26. The output of D latch 230 is the miniature page mode signal on line 100 which, after inversion, is applied as the other inhibit input to attribute decode 30 of FIG. 1.

Bus 46, carrying 16 bits of data, is applied to 16 to 4 multiplexer 210. Multiplexer 210 is provided to divide the 16 data bits on bus 46 into four groups of four. Scan line counts 2 and 4 on lines 213 and 215, respectively, are taken from scan line count bus 74. Scan line count 2 provides a Select A input and scan line count 4, the Select B input to multiplexer 210. The particular four bits taken from bus 46 are a function of the states of scan line counts 2 and 4. Scan line count 1 on line 216 is the output enable signal for multiplexer 210.

Each group of four bits is broken down one bit each on lines 242, 244, 246, and 248, respectively, on output from multiplexer 210. Those lines, 242, 244, 246, and 248 are fanned out so that each one provides two inputs to a block of eight output drivers 240. When the miniature page mode indicator on line 100 is up, it enables output from the eight output drivers comprising block 240. The two bits derived from the one bit on line 242 are output on lines 250 and 252. Similarly, the two bits from line 244 are output on 254 and 256, the two from line 246 on lines 258, 260, the two from line 248 on lines 262 and 264. These eight bits make one parallel word or byte of data on miniature page data bus 90 which provides an input to parallel to serial converter 96 in FIG. 1.

The serial output from shift register 96 is provided to video output control in the conventional manner for display on the CRT. Thus, the single bit stored in refresh memory 18 as a result of examining the data in the system main memory is changed to two double dots in a 2×4 character box for output in the miniature page mode.

Figures 3, 4:
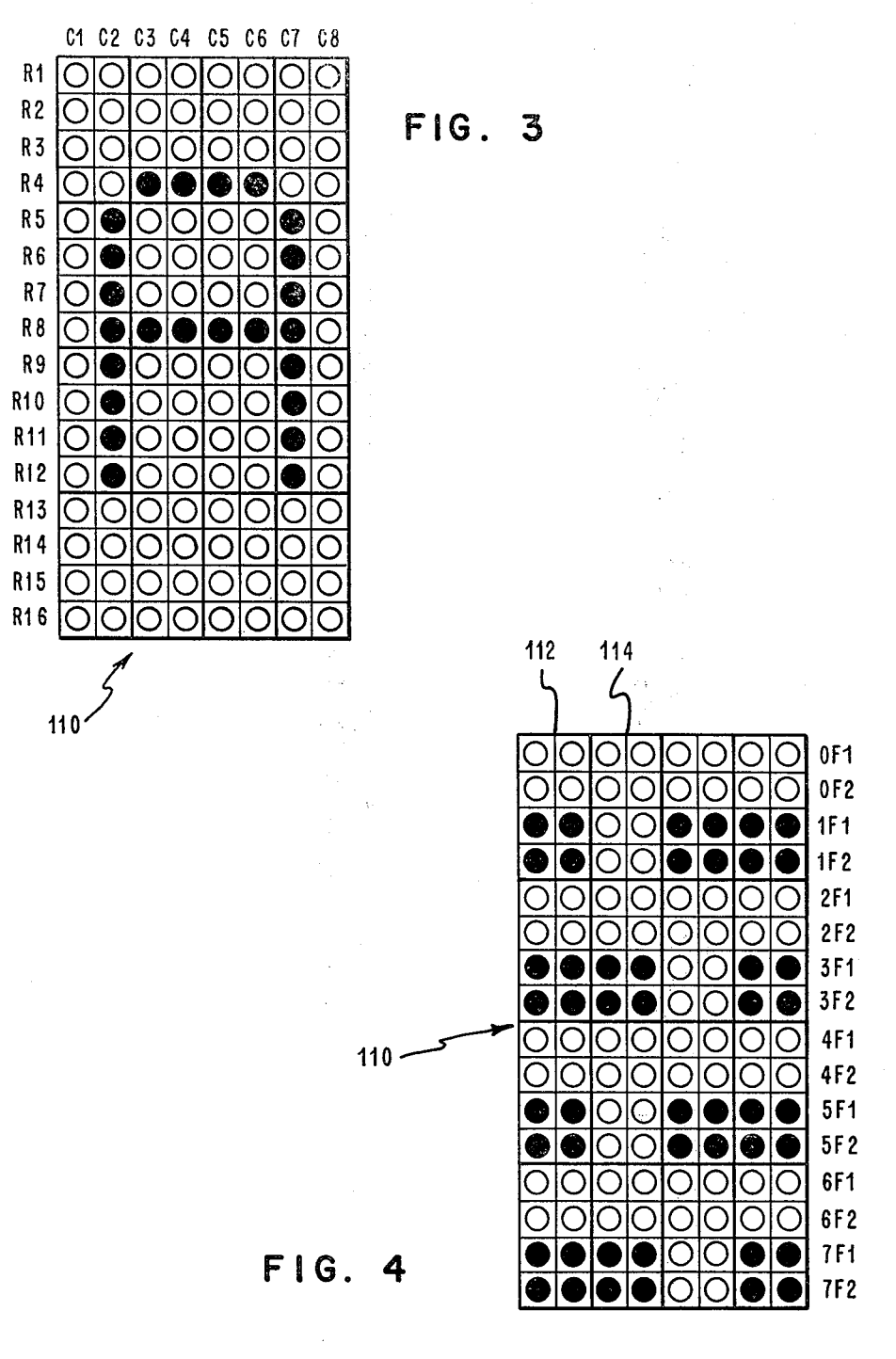

FIG. 3 is a schematic illustration of a normal size character box 110 as contemplated in the present invention. In our exemplary embodiment, this character box is 8×16, eight columns wide and 16 rows high. Rows are denoted R1 through R16; and columns, C1 through C8. A conventional CRT using interlaced scanning, as is well known in the art, can display dot matrix characters 8 dots wide by 16 dots high. Not all of these individual matrix positions are usually used for a given character. A regular character may, for example, be contained in rows 4 through 12 with the unused space being reserved for sub- and superscripts, and/or interline spacing. Columns 2 through 7 may be used for dots, and unused columns for inter-character spacing.

FIG. 4 shows how that same 8×16 matrix 110 can be divided into 16 2×4 miniature character representation boxes. In this manner we are able to display four characters for each of four consecutive lines in the space normally occupied on a CRT screen by a single, normal size character. It is to be especially noted that our miniature page display is not a display of characters, but of character representations which enable an operator to comprehend format and spatial relationships on the page being processed.

It is our character representation structure which permits miniature page display with minimal hardware impact. The use of interlaced scanning is advantageously combined with that structure. In interlaced scanning, half of the alternating horizontal lines are first scanned. These may be referred to as Field 1. The other half of the horizontal lines, alternating with Field 1 lines, are then scanned. These lines are referred to as Field 2. Scan Fields 1 and 2 are interlaced together. In FIG. 4, the 16 rows are designated as 0F1, 1F1, 2F1 . . . 7F1 or 0F2, 1F2, 2F2 . . . 7F2, where F1 and F2 indicate scan Fields 1 and 2, respectively.

We use the convention that 0 is an even number. It can be seen then that the even rows of both Fields 1 and 2 are blank, i.e., not dotted. In each of the 16 separate character representation boxes, these even rows are the topmost two rows. The bottom two rows in each box represent characters or spaces. Boxes like 112 are characters. Those like 114 are spaces.

Figure 5:
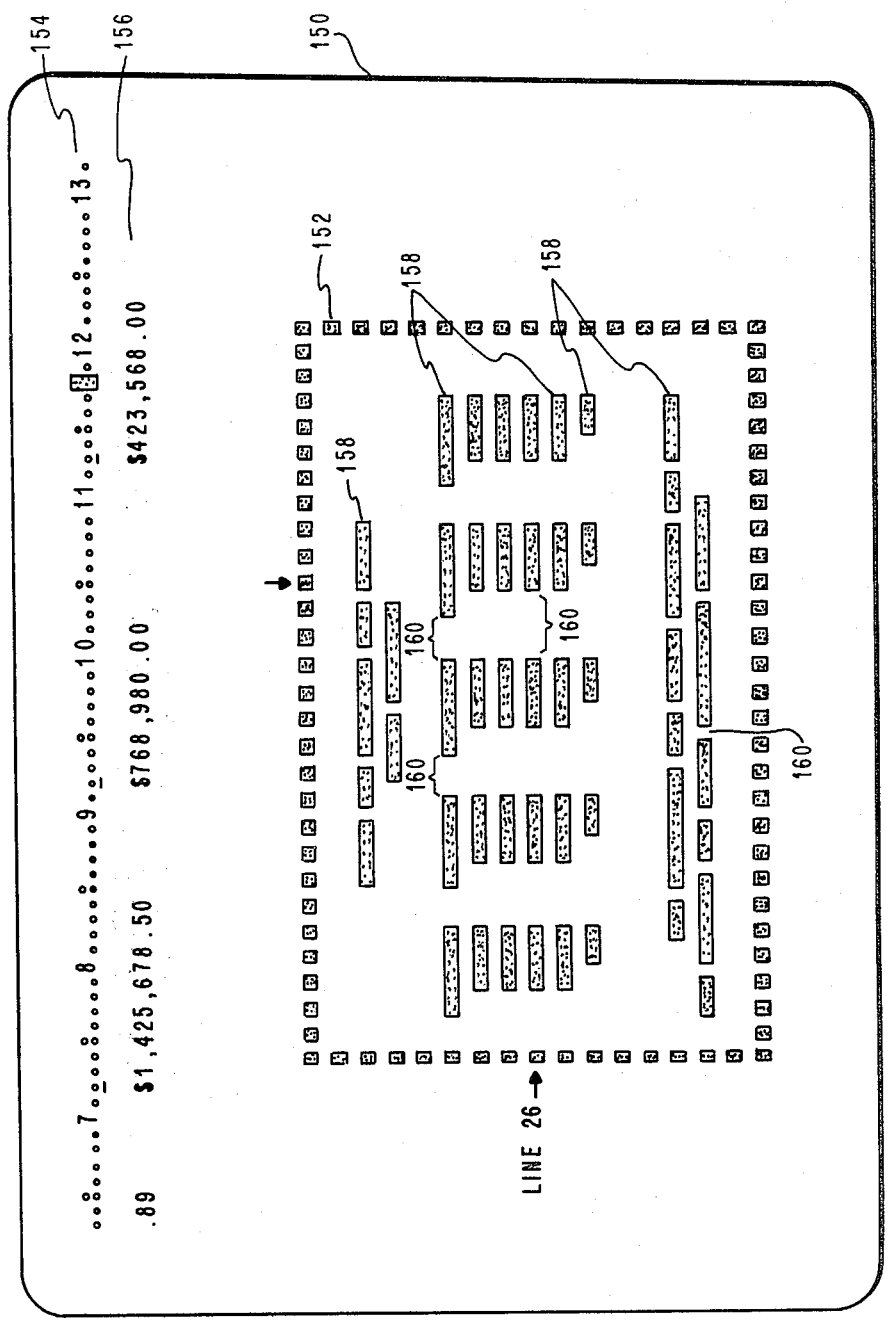
FIG. 5 is a representation of a CRT screen when the present invention is implemented.

FIG. 5 shows CRT screen 150. Indicated generally at 152 is a miniature full page representation for showing format and layout of the page being processed. Indicated generally at 154 is the scale line, and at 156 the active cursor line, that is, the text being entered or modified. Within miniature page representation 152 thick line segments 158 comprise a plurality of adjacent character representations 112 as shown in FIG. 4. Spaces 160 consist of space representations 114 shown in FIG. 4. In a conventional manner, cursor position within page representation 152 may be identified by blinking the particular miniature character representation corresponding thereto.

Figure 6:
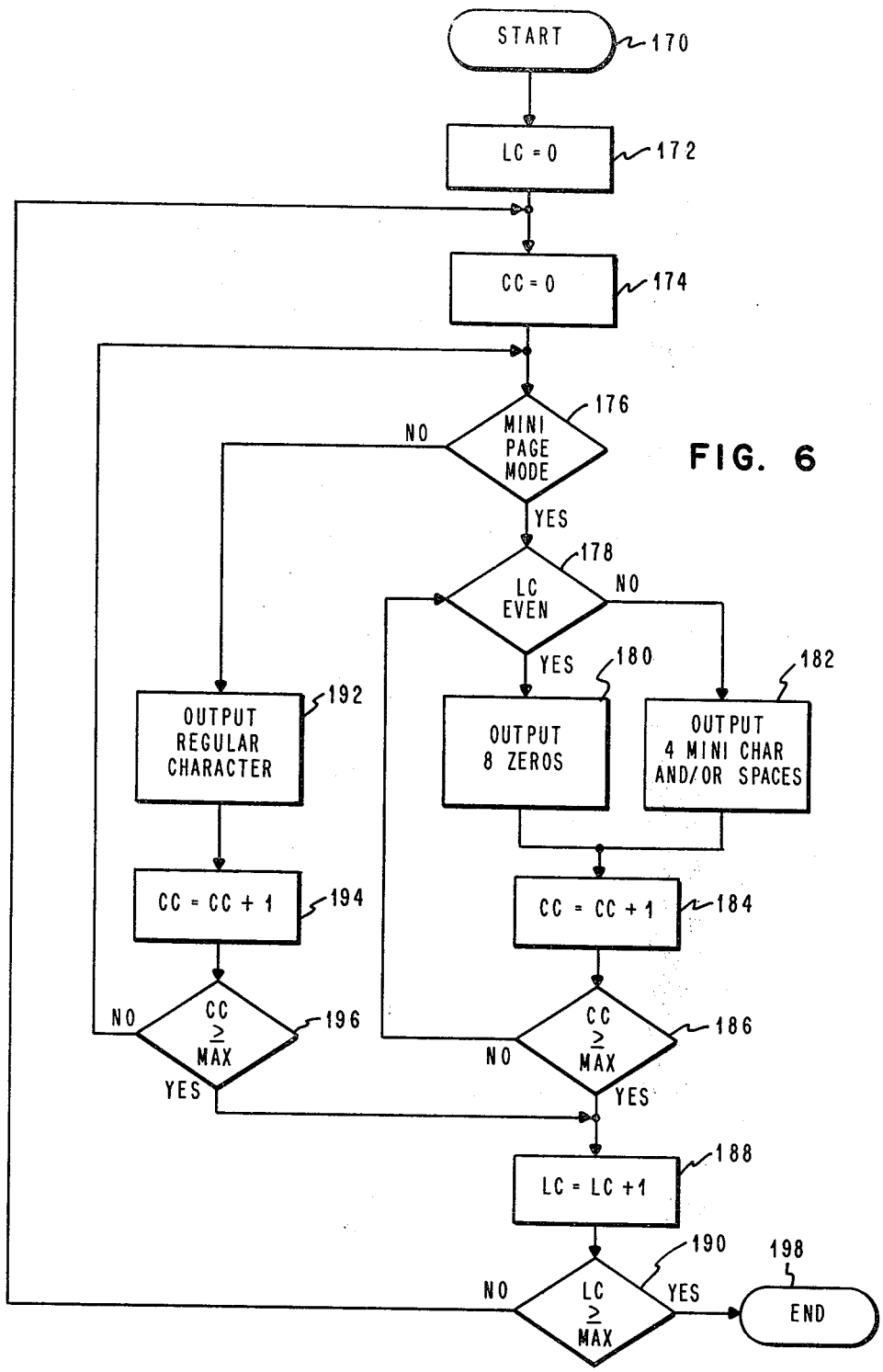
FIG. 6 shows hardware logic for displaying miniature text representations.

FIG. 6 is a flow chart of the logic for displaying on the CRT screen the line segments 158 and spaces 160 shown in FIG. 5. The process illustrated takes place in miniature page generator 50 and other associated parts of interface logic 9 (FIG. 1) in time after refresh memory 18 (FIG. 1) has been loaded with 1's and 0's under control of processor 6. These indicate each character and space comprising the page to be represented on the display screen. Text data, as is well understood by those skilled in the art, is stored in the word processing system main memory 8. Access to data in main memory 8 may be performed using conventional techniques.

The process shown in FIG. 6 is used against the character data on bus 46 in FIG. 2. That data is entered into data latch 24 (FIG. 1) via data busses 20 and 22 from the refresh memory 18.

The process begins at block 170. The scan line count, SLC, is initialized to "0" at block 172. Likewise, the character count, CC, is initialized to "0" at block 174. Next, the decision block 176 determines whether it is desired to output a miniature page. This determination is made by examining the attribute bit on line 200 (FIG. 2) dedicated to the miniature page function. This sets latch 222, FIG. 2. If a miniature page is desired, then at block 178 a determination is made of whether scan line count is even. In FIG. 1, the hardware means for generating the scan line count signal on bus 74 is represented. If scan line count is even, then 8 "0"s are output at block 180 of FIG. 6 so that blanks are displayed on the screen. If line count is not even, that is odd, then control is passed to block 182 for outputting whatever is contained in the 4 character indicating bits. If the bit on lines 242, 244, 246, and 248 (FIG. 2) in question is "1", ones are output; and if it is "0", zeros are output. Each bit, when displayed as a blank or dot, is displayed twice. Thusly, a 2×4 character representation matrix is developed from a single bit position in refresh memory 18 in FIG. 1. There are four horizontal scans made to form each miniature character representation, and, depending upon whether scan line count is an even or odd integer, a blank or dot is twice displayed.

In either event, the next step in the process is incrementing the character count at block 184. At block 186, a comparison is made to determine the relationship of character count to a predetermined maximum number of characters to be represented on a line in a particular miniature page display. If character count is greater than or equal to that maximum, scan line count is incremented as shown at 188. Horizontal retrace occurs at this same time. That is, line 66 (FIG. 1) has the horizontal reset signal applied thereto in the conventional manner. If the character count is less than the allowable maximum, control is returned to block 178 to complete the line being displayed.

After incrementing scan line count in block 188, block 190 indicates a determination of the relationship of scan line count magnitude to a predetermined maximum. If scan line count is greater than or equal to the maximum, the process terminates at block 198. If scan line count is less than maximum at block 190, a return is made to block 174 where character count is reset to "0", and the flow begins again from there to display another line.

If at decision block 176 it is determined that the next character matrix does not contain miniature page data, then a single, regular character scan is output at block 192. Character count is incremented at block 194. A decision is made at block 196 whether it is greater than or equal to the maximum of 80. If it is then the scan line count is incremented at block 188, and the flow continues from there. If character count is less than the maximum, then a return is made to decision block 176 to determine if miniature page data is desired to be displayed.

In our particular embodiment scan line count may reach a maximum of 7. There are 16 horizontal scans per line of normal characters. Having reference again to FIG. 3, a normal size character is shown in an 8×16 matrix. There are 16 rows, one for each horizontal scan. It is to be remembered that we employ interlaced scanning. Therefore, 8 rows, or lines, are output when Field 1 is scanned and 8 are output when Field 2 is scanned, as earlier described with reference to FIG. 4. In each Field these rows/lines are numbered from 0 through 7.

It is this line count for a given scan, and not the total number of lines capable of appearing on the display, to which we refer.

OPERATION OF THE INVENTION

When the miniature page mode is desired to be entered as indicated to the system by operator action, a particular bit is set in the attribute byte of the last character space before the miniature page is to be displayed. The system is structured such that when a miniature page mode is entered on a given text line, the rest of that text line is in miniature page format. Up to that point on the text line, full size text may be displayed; however, it will be recalled that in this particular system a full size character is placed in an 8×16 character box and that the character construct used in the miniature page mode is a 2×4 character box. Sixteen miniature page character representation constructs fit in the space normally occupied by a full size character so that in one full size character box four miniature characters from four text lines, which will be sequential lines, are displayed.

When the text data is examined in the main memory 8 of FIG. 1 and one bit stored in the refresh memory 18 for each character or space, a given storage location of 16 bits is arranged so that there are four groups of four bits representing four characters or spaces from four different lines.

Referring again to FIG. 1, the overall block diagram of the display word processing system including our invention, normal data flow when only full size text is to be displayed is from the main memory 8 to the refresh memory 18. The attribute byte on bus 20 which normally governs such things as cursor, blinking, reverse video, goes to the video control 40; and the data byte on bus 22 is used to access the character generator storage 76 so that the correct code is sent over busses 92 and 94 to parallel to serial converter 96 and thence to video control 40. When in the miniature page mode, however, there is but one attribute for the remainder of the line and once that has been detected the hardware path switches so that the path of the attribute data to the video control 40 is blocked and the path of the data bus 44 through the character generator storage 76 is blocked.

Rather, both attribute and data busses 20 and 22 are placed along one bus 46 which goes through the miniature page generator 50 and thence to the parallel to serial converter 96 via busses 90 and 94 and thence to the video control 40. It will be recalled from the discussion of FIG. 2, a more detailed diagram of the miniature page generator, that the one bit stored in the refresh memory 18 for each character or space is doubled for input to output driver block 240 and then output to the parallel data bus 90 which is serialized and sent to the video control for display on the screen.

In conclusion, we have provided a technique for displaying on a screen having 25 lines of 80 character positions each, a representation of a full page of text on less than the entire screen. We have accomplished this with minimal hardware impact. While this embodiment describes the invention being used with horizontal interlace scanning, it should be obvious to one skilled in the art to make appropriate modifications for use with progressive scanning and/or vertical scanning equipment.

While our invention has been described with reference to a particular embodiment and to display equipment having certain characteristics, obviously modifications may be made to comply with the requirements of other display equipment without departing from the scope and intent of our invention.

We claim:

1. For use in a word processing system including a CRT of the interlaced scanning type, wherein odd and even numbered lines are alternately scanned, a main memory, and a refresh buffer, and in a method of displaying a representation of a full page of text on less than the entire CRT the method of developing a miniature character representation symbol including the steps of:
    (1) storing in said refresh buffer an indicator of the presence or absence of a character of text stored in the main memory;
    (2) monitoring the line count number during scanning on output for developing a signal representative thereof;
    (3) displaying blanks on the CRT when said signal indicates the line count is even; and
    (4) displaying the indicators stored in the refresh memory when said signal indicates the line count is odd.

2. The method of claim 1 wherein said storing step includes setting a single bit in said refresh buffer for each text character position in the main memory.

3. The method of claim 1 or claim 2 wherein said fourth step of displaying includes displaying each indicator twice.

4. In combination with a word processing system including a horizontally interlaced scanning display wherein the odd and even lines are alternately scanned, a display memory, a main memory, apparatus for displaying a representation corresponding to a full page of printed text in miniature on less than the entire display, said displayed representation comprising miniature character representation symbols, generated by:
    means for storing a binary indicator in the display memory for each character position in said main memory associated with the full page of text;
    means for displaying at least a first portion of a miniature character representation symbol as a function of the location of the output scan; and
    means for displaying the other portion of a miniature character representation symbol as a function of the location of the output scan and the value of the indicator stored in the display memory.

5. The apparatus of claim 4 further including:
    means for monitoring the line count number during scanning on output;
    said means for displaying at least a first portion including means for displaying blanks on the CRT if the output scan line count is even; and
    said means for displaying the other portion including means for displaying character representations as determined by the value of indicator accessed in the refresh memory if the output scan line count is odd.

6. The apparatus of claim 4 wherein the means for displaying the other portion of miniature character representation symbol further includes using a character box size which is an integral fraction of a normally displayed character box size.

7. The apparatus of claim 6 wherein the character box size for displaying a miniature character representation symbol is a 2×4 matrix and the normally displayed character box size is an 8×16 matrix.

8. The apparatus of claim 7 wherein:

said means for displaying a first portion of the miniature character representation symbol further includes:
means for displaying the top two rows of said 2×4 matrix as blanks; and
said means for displaying the other portion of said miniature character representation symbol further includes means for displaying the bottom two rows of said 2×4 matrix as two blanks if the binary indicator is off and as two non-blanks if the binary indicator is on.

* * * * *